United States Patent
Trampert et al.

(10) Patent No.: US 11,927,477 B2
(45) Date of Patent: Mar. 12, 2024

(54) METHOD FOR PHOTOMETRIC CHARACTERIZATION OF THE OPTICAL RADIATION CHARACTERISTICS OF LIGHT SOURCES AND RADIATION SOURCES

(71) Applicant: TechnoTeam Holding GmbH, Ilmenau (DE)

(72) Inventors: Klaus Trampert, Karlsruhe (DE); Udo Krüger, Werra-suhl-Tal (DE); Christian Schwanengel, Ilmenau (DE)

(73) Assignee: TECHNOTEAM HOLDING GMBH, Ilmenau (DE)

( * ) Notice: Subject to any disclaimer, the term of this patent is extended or adjusted under 35 U.S.C. 154(b) by 164 days.

(21) Appl. No.: 17/378,612

(22) Filed: Jul. 16, 2021

(65) Prior Publication Data

US 2022/0018709 A1    Jan. 20, 2022

(30) Foreign Application Priority Data

Jul. 17, 2020  (DE) ..................... 10 2020 208 992.2

(51) Int. Cl.
*G01J 1/42* (2006.01)
*G01J 1/02* (2006.01)
(Continued)

(52) U.S. Cl.
CPC ........... *G01J 1/4257* (2013.01); *G01J 1/0238* (2013.01); *G01J 1/0242* (2013.01); *G01J 1/0266* (2013.01);
(Continued)

(58) Field of Classification Search
CPC ...... G01J 1/4257; G01J 1/0238; G01J 1/0266; G01J 1/0242; G01J 1/420214;
(Continued)

(56) References Cited

U.S. PATENT DOCUMENTS

2017/0165848 A1*  6/2017  Diem ................ G01J 1/0242
2018/0003553 A1*  1/2018  Hammer .............. G01J 1/0242
2019/0362519 A1* 11/2019  Haverkamp ............ G06T 7/73

FOREIGN PATENT DOCUMENTS

CN    200504355 A    2/2005
CN    202007934 A    2/2020
(Continued)

OTHER PUBLICATIONS

European Search Report, dated Dec. 16, 2021 for corresponding European Application No. EP 21 18 5743 with English translation (11 pages).
(Continued)

*Primary Examiner* — Dominic J Bologna
(74) *Attorney, Agent, or Firm* — Intellectual Property Law Group LLP

(57) ABSTRACT

The present disclosure relates to a method for photometrical charting of a light source (Q, 3) clamped within a positioning device (1) and stationary relative to an object coordinate system (T) by means of a luminance density measurement camera (4) arranged stationary relative to a world coordinate system (W), wherein the light source (Q, 3) is moved between a first actual measurement position (P1') and at least one further actual measurement position (P2' to P5') along a kinematic chain of the positioning device (1) within the world coordinate system (W), wherein a luminance density measurement image (81 to 85) describing the spatial distribution of a photometric characteristic within a measurement surface is recorded by means of the luminance density measurement camera (4) in each actual measurement position (P1' to P5') with the light source (Q, 3) turned on, and wherein the position and/or orientation of the object coordinate system (T) relative to the world coordinate system (W) is recorded in each actual measurement position (P1' to P5') in direct reference to the world coordinate system (W)
(Continued)

without reference to the kinematic chain of the positioning device (1). Moreover, the present disclosure relates to the use of such a method for photometric charting of a headlight (3).

18 Claims, 8 Drawing Sheets

(51) Int. Cl.
  *G01M 11/02* (2006.01)
  *G01M 11/06* (2006.01)
(52) U.S. Cl.
  CPC ........... *G01J 1/42* (2013.01); *G01M 11/0214* (2013.01); *G01M 11/0221* (2013.01); *G01M 11/061* (2013.01); *G01M 11/065* (2013.01); *G01J 2001/4247* (2013.01)
(58) Field of Classification Search
  CPC ......... G01J 2001/4247; G01M 11/061; G01M 11/065; G01M 11/0221; G01M 11/0214
  See application file for complete search history.

(56) References Cited

FOREIGN PATENT DOCUMENTS

| DE | 10 2014 205 430 A1 | 9/2015 |
| DE | 10 2015 201 093 A1 | 7/2016 |
| DE | 10 2018 208 203 A1 | 11/2019 |

OTHER PUBLICATIONS

Lindemann M et al.: "Robot goniophotometry at PTB", Metrologia, Institute of Physics Publishing, Bristol, GB, vol. 52, No. 2, Feb. 5, 2015 (Feb. 5, 2015), pp. 167-194.

Chr. Schwanengel: "Comparison of techniques for measuring luminous intensity distribution overall and across sections", Aug. 1, 2010, New York, Found in the internet: URL:https://www.technoteam. de/e6009/e6311/e5983/pb_download5985/LVK_Messtechniken_ger.pdf, with English translation (116 pages).

Germany Office Action, dated Mar. 23, 2021 for corresponding German Application No. DE 10 2020 208 992.2 with English translation (10 pages).

B. Zitova, J. Flusser, "Image registration methods: a survey", Image and Vision Computing, vol. 21, 2003, pp. 977-1000.

Taiwan Office Action, dated Jul. 6, 2022 for corresponding Taiwan Application No. 110124276 with English translation (13 pages).

* cited by examiner

METHOD FOR PHOTOMETRIC CHARACTERIZATION OF THE OPTICAL RADIATION CHARACTERISTICS OF LIGHT SOURCES AND RADIATION SOURCES

CROSS-REFERENCE TO RELATED APPLICATION

This application claims priority to German patent application no. 10 2020 208 992.2 filed on Jul. 17, 2020, which is hereby incorporated by reference in its entirety.

BACKGROUND

1. Field of Invention

The present disclosure relates to a method for spatial characterization of the optical radiation characteristics of a light source stationary clamped within a positioning device by means of a luminance density measurement camera arranged stationary relative to a world coordinate system, wherein the light source is moved between a first actual measurement position and at least one further actual measurement position along a kinematic chain of the positioning device within the world coordinate system. Moreover, the present disclosure relates to a use of such a method for photometrical charting of headlights.

2. Background Art

For the characterization of the optical properties of light sources, particularly of lamps and lights, their radiation characteristics are of interest, in particular the luminance intensity distribution, also referred to as luminance intensity distribution body or luminance intensity distribution curve (LIDC).

When charting the LIDC of headlights, particularly high demands are made to the spatial resolution of the measurement instrumentation, as high gradients in the LIDC require a very precise positioning of the object of typically 0.01° here in order to record the measuring points in the object coordinate system with sufficiently high precision and/or accuracy.

Headlights are used in many fields of lighting technology, e.g. vehicle headlights, stage projectors, street lighting, signal lights in railway and road traffic and also beacons in aeronautics and ship technology.

Different methods have been established here which have been introduced inter alia into the norms EN 13032 part 1 and part 4, CIE 121 and for the automotive field into the ECE regulation R1 and others as well as into the Federal Motor Vehicle Safety Standard and CCC based on Guobiao Standards.

For the direct photometric charting of headlights, goniophotometers are applied in which a photo sensor (photometer head) is arranged at a defined distance to the headlight and illuminated by the same. For the spatial recording of the optical radiation characteristics, the headlight is rotated about at least one rotation axis. In a goniophotometer configured as a light reverser, the headlight is rotated about two rotation axes which are orthogonal to one another during photometrical charting, wherein the rotation axes intersect in a rotation center.

In a goniophotometer configured in this way, an object coordinate system, which here and in the following is always defined with reference to the object to be charted, e.g. with reference to the headlight or more generally to a light held by the goniophotometer, is moved relative to the world coordinate system when the object is rotated about at least one rotation axis.

The dimensions and the weight of headlights, e.g. vehicle headlights, including the required stiff holders in combination with the high positioning accuracy result in high demands to the mechanical precision and/or accuracy and robustness, e.g. the bending stiffness and the torsional stiffness, of such goniophotometers.

With indirect photometric charting, the radiation emitted by the headlight is captured by a medium arranged at a sufficiently high distance in the optical path of the headlight. Such media are configured diffuse reflective or scattering and preferably spectrally neutral. With such an indirect photometric measurement method, the diffuse reflective or scattering medium can be recorded with an imaging method in a single exposure step. This allows for a faster measurement compared to point by point sequential recording of an LIDC by means of a goniophotometer.

A partial luminous flux of the headlight on the illuminated medium is recorded by means of a luminance density measurement camera. The medium may be arranged in a transmitted light optical path, i.e.: transmitting between the luminance density measurement camera and the headlight, or in an impinging light optical path, i.e.: reflecting the light of the headlight. The medium may be configured as a curved or flat surface.

The LIDC may be determined from the luminance density distribution recorded by the luminance density measurement camera and scattered or reflected at the illuminated medium analyzing the geometrical relation between the luminance density measurement camera, the medium and the headlight.

Moreover, incremental methods are known, in which several partial LIDCs are recorded at different angular positions of the headlight relative to the medium and used to determine an overall LIDC. This requires performing a geometric transformation for correction, e.g. of a distortion, a rectification and/or coordinate transformation, as well as a photometric transformation transforming luminance density values to luminosity or illuminance.

Herein, measuring setups and measuring methods are known, in which the headlight is rotated relative to the medium about one or more axes by means of a goniometer. Such goniometers are also subject to high demands to precision and/or accuracy since an angular position of the measuring object (headlight) set at the goniometer enters into the determined LIDC via the geometric and/or photometric transformation.

SUMMARY

The object of the present disclosure is to provide an improved method for spatial characterization of the optical radiation characteristics of a light source moved by means of a positioning device relative to a world coordinate system. Moreover, the object of the present disclosure is to provide a use of such a method for an improved photometric charting of a headlight.

In a method for photometric charting of a light source, the same is clamped in a positioning device. The positioning device is configured for moving the light source between actual measurement positions indicated relative to a world coordinate system. Preferably, the positioning device is configured for rotating the light source about rotation axes which may intersect in a rotation center.

An object coordinate system is defined stationary relative to the clamped light source.

The photometric charting is performed by means of a luminance density measurement camera arranged stationary relative to the world coordinate system. Instead of a luminance density measurement camera, a sensor measuring point by point, e.g. a photometer, may likewise be applied for the photometric charting, e.g. by moving the light source in a scanning pattern with sufficiently dense measuring distances between the measuring points relative to the sensor measuring point by point.

In the optical path from the light source to the luminance density measurement camera, a reflecting and/or scattering medium may be arranged such that the medium is illuminated by the light source and the light reflected and/or scattered by the medium is recorded by the luminance density measurement camera. In other words, the photometric charting may be indirect.

Likewise, it is possible to indirectly illuminate the luminance density measurement camera by the light source or to directly record the luminance density distribution of the light source by the luminance density measurement camera.

The light source is moved between a first actual measurement position and at least one further actual measurement position along a kinematic chain of the positioning device within the world coordinate system. The kinematic chain extends from one element arranged stationary relative to the world coordinate system, e.g. a base, to an element in which the light source is clamped in a fixed position and which may for example be configured as a holding device.

The positioning device may comprise a plurality of machine coordinate systems which may be moved (shifted and/or rotated) against each other according to the kinematic chain. In particular, the positioning device comprises a holding coordinate system referring to the holding device which is at the end of the kinematic chain.

For a mechanically stiff holding device, in which the light source is sufficiently firmly fixed during the measurement, the object coordinate system (referring to the light source) and the holding coordinate system (referring to the holding device) are interlinked by a constant transformation which may be described as a constant pose of the object coordinate system relative to the holding coordinate system.

Likewise, it is possible, e.g. by elastic deformation of the holding device, that the position and/or orientation of the object coordinate system, i.e. the pose, vary relative to the holding coordinate system during the measurement.

In each actual measurement position a luminance density measurement image is recorded by the luminance density measurement camera with the light source turned on. The luminance density measurement image describes the spatial distribution of a photometric characteristic within a measurement surface. A measurement surface may for example be formed by the capturing plane of a flat, diffusely reflective or diffusely scattering medium which is illuminated by the light source. Likewise, a measurement plane may be curved, e.g. spherically curved.

When recording a luminance density measurement image in an actual measurement position of the light source, the position and/or orientation of the object coordinate system relative to the world coordinate system are recorded in direct reference to the world coordinate system without reference to the kinematic chain of the positioning device.

The term position refers to the three-dimensional local offset between the object coordinate system and the world coordinate system. The term orientation refers to rotation of the object coordinate system relative to the world coordinate system. The position and orientation are collectively referred to as the pose. Each actual measurement position is determined by the pose of the object coordinate system relative to the world coordinate system at the time of the measurement.

A recording of the position and/or orientation of the object coordinate system is referred to as direct and without reference to the kinematic chain of the positioning device if it takes place independently of the recording of parameters of the relative movement between the individual elements of the kinematic chain.

The method allows that the position and in particular the orientation may be determined in a cost-efficient way in direct reference, i.e. without elaborate sensorics along the kinematic chain of the positioning device.

The method further allows that mechanical and/or sensoric characteristic properties along the kinematic chain, e.g. deflection or torsion of incompletely stiff members, play or imprecision of sensors, do not affect the precision and/or accuracy of the determination of an actual measurement position.

This is particularly beneficial as the characteristic mechanical properties of the kinematic chain are affected by the occurring torques of the measuring object. These torques are dependent of the pose and the mass distribution of the measuring object. If the torque distribution is known, the characteristic deviations may in fact be compensated, however, this requires determining them first with increased effort. This additional effort does not apply with this method of directly determining the pose of the object coordinate system in the world coordinate system.

The method further allows that approaching a predetermined set measurement position with high precision and/or accuracy is not required. Instead, it is sufficient to approach a set measurement position with low precision and/or accuracy but to chart the actually reached actual measurement position with high precision and/or accuracy by direct reference in the world coordinate system. This way, a positioning of the light source is also possible with less precise and more cost-efficient positioning devices.

A positioning device provides a guaranteed positioning tolerance that specifies the maximum deviation of an actual measurement position from a predetermined set measurement position. The recording or determination of a position and/or orientation of the object coordinate system relative to the world coordinate system provides a guaranteed recording tolerance that specifies the maximum deviation of the actual position and/or orientation from the recorded position and/or orientation relative to the world coordinate system.

In an embodiment of the method, the recording of the position and/or orientation relative to the world coordinate system provides a guaranteed recording tolerance that is, with respect to at least one parameter, smaller than the guaranteed positioning tolerance of the positioning device.

This embodiment allows the usage of a less expensive positioning device while the accuracy and/or precision of the photometric measurement of the light source are maintained.

In an embodiment, a required positioning tolerance for the positioning device is determined which is sufficient such that a sequence of predetermined set measurement positions can be arranged and can be approached such that a complete recording (or registering) of the photometric characteristic of the light source is possible when the light source reaches actual measurement positions corresponding to the predetermined set measurement positions, wherein each actual measurement position is within the required positioning tolerance from the corresponding predetermined set measurement position.

A positioning device is selected for clamping the light source that provides a guaranteed positioning tolerance less or preferably equal to the determined required positioning tolerance.

This embodiment of the present disclosure relies on the insight that it is sufficient to determine the actual measurement position with a good accuracy, while the positioning itself, i.e. the mechanical driving of the light source into a pre-set pose, may be much less accurate. This is particularly beneficial for relatively heavy objects as light sources that require a particularly high mechanical stability of a positioning device.

This embodiment allows the use of a particularly inexpensive positioning device while the accuracy and/or precision of the photometric measurement of the light source are maintained.

In an embodiment, a positioning device with a positioning tolerance of at least ±1 millimeter, preferably of at least ±5 millimeters is selected.

This embodiment allows the use of a particularly inexpensive positioning device while the accuracy and/or precision of the photometric measurement of the light source are maintained.

In an embodiment of the method, a medium is arranged in a fixed position and orientation relative to the world coordinate system, the medium configured for diffuse reflection and/or scattering of the light emitted by the light source. For example, such a medium may be configured as a diffusely reflecting screen or as a diffusion disk.

The medium is arranged such that it is illuminated by the light source and that the diffusely reflected and/or scattered light is recorded by the luminance density measurement camera in a luminance density measurement image.

The benefit of such an indirect photometric charting is that a relatively large segment of the light distribution may be recorded with a single measurement. The size of the segment depends on the size of the medium carried out.

In an embodiment of the present disclosure, the luminance density measurement camera may directly, i.e. without a medium, capture the light source. In this embodiment, the measurement surface is arranged on a surface of the light source facing the luminance density measurement camera.

Furthermore, imaging optical components, e.g. lenses and/or mirrors, may be arranged for beam steering or beam forming in the illumination optical path from the light source to the medium (for the indirect photometric charting) or from the light source to the luminance density measurement camera (for the direct photometric charting).

In an embodiment of the method, the light source is rotated around at least one axis running through a rotation center during the photometric charting. This allows for a particularly easy assessment of the light source, as the point of origin of the object coordinate system referring to the light source coincides with the rotation center, and thus an additional coordinate transformation is not required for obtaining an LIDC.

In an embodiment of the method, in a first step, the position of the object coordinate system relative to the world coordinate system is determined by direct probing of at least one measuring mark. In a second step, the orientation of the object coordinate system relative to the world coordinate system is determined.

This embodiment of the method allows an assessment of the light source wherein a determination of the position with low precision and/or accuracy, e.g. with an acceptable positioning imprecision of one millimeter, is sufficient and possible with cost-efficient methods. In contrast, a determination of the orientation is required with a high precision, e.g. with an acceptable angular deviation of $1/100$ degree. By separating the determination of the positioning from the determination of the orientation, an overall cost-efficient and sufficiently precise determination of the pose and thus an improved photometric charting of the light source may be achieved.

In an embodiment of the method, the position and/or the orientation of the object coordinate system is determined by recording at least one measuring mark by means of at least one referencing camera in each case.

Measuring marks and referencing cameras are inexpensively available and may easily be arranged and operated at a positioning device and/or in a surrounding space. Moreover, the recording of measuring marks by referencing cameras is possible in a particularly fast, nearly instantaneous, way.

In an embodiment of the method, at least one referencing camera is arranged stationary relative to the world coordinate system and at least one measuring mark is arranged stationary relative to the object coordinate system. Since a measuring mark may be configured small and light and may be easily fastened and released, a particularly simple, cost-efficient and precise measurement is facilitated.

In an embodiment of the method, at least one referencing camera is arranged stationary relative to the object coordinate system and at least one measuring mark is arranged stationary relative to the world coordinate system. Preferably, at least one measuring mark is formed from space features, e.g. installation devices or features of architecture, arranged stationary in the world coordinate system. This way, a particularly easy and flexible recording of the pose of the world coordinate system is possible.

In an embodiment of the method, at least one measuring mark is configured as an active measuring mark for emitting a radiation recordable by at least one referencing camera assigned to this measuring mark. Active measuring marks can be particularly well recognized and localized in images of a referencing camera. Radiation emitted by different active measuring marks may be configured discriminable spectrally and/or temporally. This way, the reliability in recognizing measuring marks may be improved.

In an embodiment of the method, at least one capturing plane is arranged stationary in the world coordinate system. When approaching an actual measurement position, the position of the object coordinate system is determined and the orientation of the object coordinate system is determined from the charting of a modulated, i.e. varying dependent on the position and on the solid angle, illumination emitted with a known direction relative to the object coordinate system and captured on the at least one capturing plane, in each case.

This method allows that by charting the distortion of an illumination modulated in a known way, an angle relative to the capturing plane may be determined very precisely and simply.

In an embodiment of the method, the modulated illumination is generated by means of a diffractive-optical element (DOE) as a projection matrix comprising at least one projection structure. A projection structure is projected along a pilot beam onto a capturing plane in each case.

The projection matrix may be a dot matrix, wherein projection structures configured as projection points are arranged intermittently.

Such projection matrices may be generated in a particularly easy way and may be analyzed with high precision and/or accuracy by recording the projection matrix captured on the capturing plane by means of a camera and by localizing the at least one projection structure in the image of the camera.

The projection points may be arranged at regular intervals, e.g. equispaced. By means of such projection matrices, a change of the position of the point matrix projected on the capturing plane and/or a change of the projection direction within a range dependent on the point interval may be determined with high precision and/or accuracy.

The at least one projection structure may likewise be modulated (structured) regarding the position in an irregular way. For example, a projection structure may be chosen such that it generates a two-dimensional aperiodically shaped brightness distribution whose two-dimensional autocorrelation function preferably has only one maximum and is particularly preferably shaped similar to a Dirac pulse. By means of projection structures of such shape, a change of the position of the projection on the capturing plane may be unambiguously determined across a particularly large range.

In other embodiments, the modulated illumination is configured as a strip projection or as a grid projection. There are methods known in the art, by which the inclination of an optical axis, along which a strip projection or grid projection is projected on a capturing plane, may be determined with reference to the surface normal of the capturing plane.

In an embodiment of the method, the modulated illumination is emitted by the light source and projected directly onto the luminance density measurement camera or indirectly recorded by the luminance density measurement camera as a luminance density projected onto a medium or capturing plane.

Actual measurement positions respectively lying within a predetermined distance around a set measurement position, are approached, wherein in each actual measurement position, at least one luminance density measurement image is recorded.

The set measurement positions are chosen such that at least two luminance density measurement images overlap, wherein the offset between luminance density measurement images overlapping each other is determined by means of an image registering method, and the respective orientation of the object coordinate system is determined from the offset and from the actual measurement positions respectively assigned to the luminance density measurement images.

This embodiment allows that a determination of the direction of the object coordinate system is possible with the existing two luminance density measurement camera and therefore without additional effort.

In an embodiment of the method, for each actual measurement position, a respective set measurement position is determined by analyzing parameters of the positioning device. The position and orientation of the object coordinate system is recorded based on the set measurement position.

This embodiment allows to use set measurement position for an approximate determination of the actual measurement position. Thus, the measuring range for the precise recording of the actual measurement position in direct reference (without reference to the kinematic chain) can be reduced. This allows for a more simple and at the same time more precise recording of the actual measurement position and thus for a more simple and more precise photometric charting.

In an embodiment of the method, for approaching a set measurement position, the positioning device is respectively controlled such that an actual measurement position is reached within a predetermined distance from the respectively assigned set measurement position. For example, the control may be carried out in an iterative manner by stepwise reduction of the distance between the actual measurement position and the set measurement position.

This embodiment allows a particularly high precision and/or accuracy in the positioning of the light source. This, in turn, allows for a particularly precise photometric charting.

The method described may be applied for photometric charting of a headlight. Headlights are subject to particularly high precision and/or accuracy requirements for a photometric charting. In a beneficial way, these particularly high precision and/or accuracy requirements may be met by the proposed method even if the positioning device has a higher imprecision than accepted for methods known in the art when approaching set measurement positions.

This way, the technical and procedural effort may be reduced. For example, it is possible to apply positioning devices with higher mechanical play and lower bending stiffness and torsional stiffness of the elements of the kinematic chain than what would be possible with photometrical charting methods known in the art.

In particular, the method described may be applied for photometric charting of a vehicle headlight. For photometric charting of vehicle headlights, a simple measurement procedure which may be realized with cost-efficient positioning devices and at the same time a high precision and/or accuracy and repeatability are particularly important.

BRIEF DESCRIPTION OF THE DRAWINGS

In the following, embodiments of the present disclosure are described in more detail with reference to drawings.

Corresponding parts are provided with the same reference signs in all figures.

DETAILED DESCRIPTION OF SPECIFIC EMBODIMENTS

Figure 1:
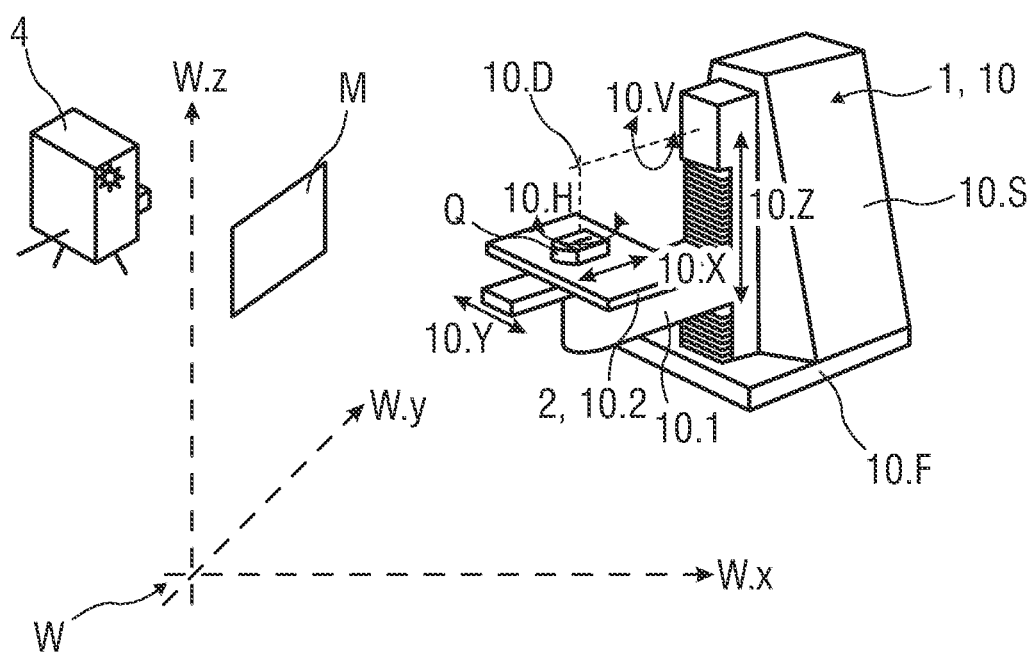
FIG. 1 is a schematic view of a prior art positioning device configured as a goniometer for positioning a light source.

FIG. 1 shows a prior art positioning device 1 for positioning a light source Q. For example, the positioning device 1 is configured as a goniometer 10.

A base 10.F of the goniometer 10 stands stationary in a Cartesian world coordinate system W and carries a stand 10.S. The world coordinate system is defined by the world x-axis W.x, the world y-axis W.y and the world z-axis W.z intersecting in a point of origin.

The goniometer 10 comprises a holding device 2 configured for holding and releasably fastening of a light source Q. For example, the holding device 2 may be configured as a holding plate 10.2, preferably as a perforated grid plate. The holding plate 10.2 is connected to the stand 10.S through a standf arm 10.1.

The stand arm 10.1 is rotatable about a vertical rotation axis 10.V relative to the stand 10.S. Moreover, the stand arm 10.1 comprises a rotation device not shown in detail, by means of which the holding plate 10.2 arranged thereon may be rotated about a horizontal rotation axis 10.H fixed to the stand arm 10.1, the horizontal rotation axis 10.H oriented orthogonally to the vertical rotation axis 10.V and intersecting the same in a rotation center 10.D.

Moreover, the holding plate 10.2 may be shifted relative to the stand arm 10.1 along three translation axes 10.X, 10.Y and 10.Z, which are orthogonal to one another, such that an optical center or another reference point of a light source held by the holding plate 10.2 is moved to the rotation center 10.D.

This way, the light source Q can be rotated about the rotation axes 10.H, 10V in the rotation center 10.D. The light source Q is rotated such that the luminous flux emitted by the light source Q at least partially falls onto a medium M which may be configured diffusely reflective or scattering. There, the luminous flux generates a luminance intensity resulting in a luminance density of the medium M which can be measured by a luminance density measurement camera 4 in an image-resolving way.

The position and orientation of the luminance density measurement camera 4 and also of the medium M to one another and to the world coordinate system W are known and fixed during the charting of the light source Q. If the position and orientation of the light source Q in the world coordinate system W is also known, then a partial luminance intensity distribution body may be determined from the luminance density of the medium measured in the image-resolving way, wherein the partial luminance intensity distribution body indicates the luminance intensity distribution emitted by the light source Q as a function of an angle of radiation.

In this context, the determination of the partial luminance intensity distribution body is restricted to the solid angle range at which light emitted by the light source Q falls on the medium M.

By rotating the light source Q about the rotation axes 10.H, 10.V in the rotation center 10.D, a plurality of partial luminance intensity distribution bodies may be recorded and, based on this, a luminance intensity distribution body, covering a larger solid angle range for the angle of radiation than the individual partial luminance intensity distribution bodies, may be determined.

In the prior art, the determination of the position and orientation of the light source Q is limited by the positioning errors and position determination errors propagating along kinematic chain from the base 10.F to the holding plate 10.2 with the light source Q fixedly connected thereto. Moreover, the determination of the position and orientation of the light source Q is limited by unknown deviations from the model assumption, e.g. by insufficient mechanical stiffness of the stand arm 10.2.

Thus, a determination of the position and orientation of the light source Q as known in the art requires highly precise sensors along the kinematic chain, presently highly precise sensors for detecting the shift of the holding plate 10.2 carried out along the translation axes 10.X, 10.Y, 10.Z relative to the stand arm 10.1 and for detecting the rotation angles about the rotation axes 10.V and 10.H, and is even then only possible with limited precision and/or accuracy, e.g. due to the sag of the stand bracket which is coaxial to the first translation axis 10.X.

Thus, there is a need for a device and a method capable of determining a luminance intensity distribution body of a light source Q movable along a kinematic chain relative to the world coordinate system W without interference and measuring errors along the kinematic chain limiting the determined luminance intensity distribution body in its precision and reliability.

Figure 2:
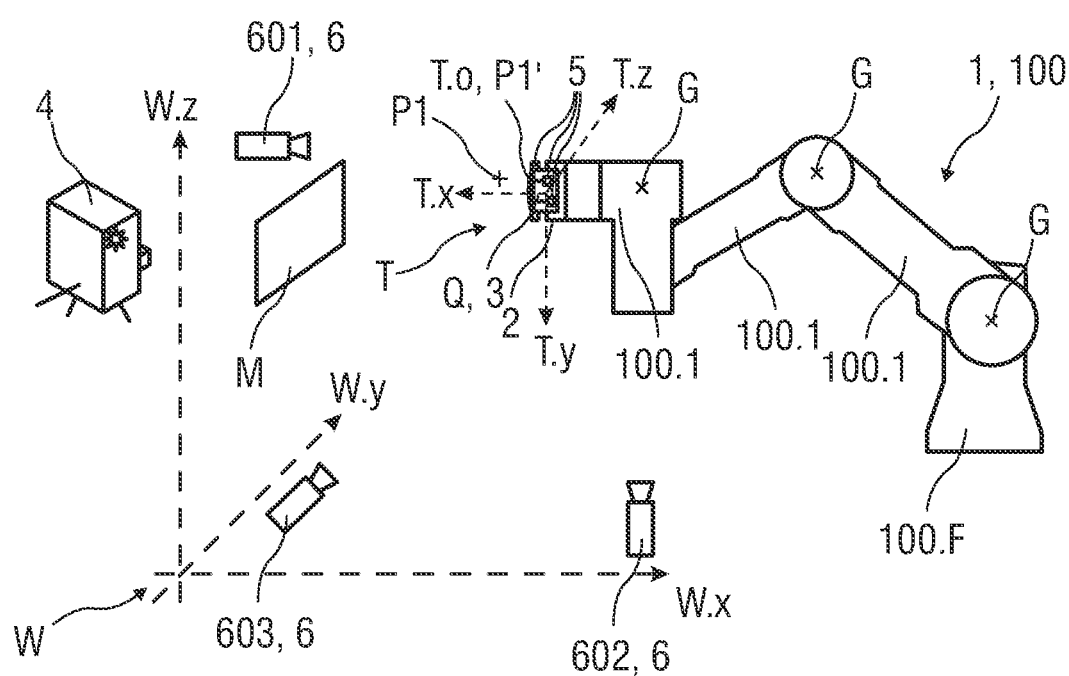
FIG. 2 is a schematic view of a positioning device configured as an industrial robot with measuring marks arranged thereon.

FIG. 2 shows a further positioning device 1, e.g. configured as an industrial robot 100. The industrial robot 100 comprises a holding device 2 arranged at the free end of an arm segment 100.1.

Preferably, the holding device 2 is configured as a platform with different fastening options, e.g. a perforated grid plate or a mounting frame, and configured to receive and hold an object, preferably a light source Q. Particularly preferably, the holding device 2 is configured to receive a headlight 3.

A Cartesian object coordinate system T is defined relative to the object held by the holding device 2, the Cartesian object coordinate system T being determined by the object x-axis T.x, the object y-axis T.y and the object z-axis T.z intersecting in an object coordinate system point of origin T.O. If, for example, the object held is a light source Q, the object coordinate system T may be determined by a photometric reference point and a photometric reference axis.

The industrial robot 100 comprises multiple hinge axes G about which a single arm segment 100.1 rotates or about which two interlinked arm segments 100.1 may rotate relative to each other. By rotating about the hinge axes G, the holding device 2 may be moved within a Cartesian world coordinate system W. Furthermore, the holding device 2 may be rotated relative to the world coordinate system W along at least one axis by rotation about the hinge axis G. Preferably, the industrial robot 100 is configured such that a headlight 3 held by the holding device 2 may be independently rotated along two axes about a rotation point and be moved relative to this rotation point.

In other words: By rotation about the hinge axis G, a change of the object coordinate system T relative to the world coordinate system W is caused along a kinematic chain from a base 100.F of the industrial robot 100, which stands stationary in the world coordinate system W, up to the holding device 2. The kinematic chain is determined by the relative rotation angle of arm segments 100.1 which are linked to a hinge axis G through a respective hinge.

An industrial robot 100 comprises a particularly great number of degrees of freedom and is particularly flexibly movable and programmable. Likewise, instead of the industrial robot 100, any other kind of movable positioning device 1 having a holding device 2 and allowing for repositioning an object to be charted in space held by the holding device 2 may be applied. In particular, goniometers 10 of the design shown in FIG. 1 may also be applied as a positioning device 1.

If a light source Q, e.g. a headlight 3, held by the holding device 2 is charted by a measuring device arranged stationary relative to the world coordinate system W, the assessment of the measurements of the measuring device requires determining the position and orientation of the object coordinate system T relative to the world coordinate system W. The measuring device is configured for determining the luminance intensity distribution body of the light source Q across at least a partial range of the solid angle of radiation.

Preferably, the measuring device is configured for indirectly determining at least one partial luminance intensity distribution body In the present embodiment, the measuring device comprises a luminance density measurement camera 4 configured for recording at least one photometric characteristic, and a medium M.

The headlight 3 is oriented and positioned by means of the industrial robot 100 such that the luminous flux emitted by it at least partially falls on the medium M.

The medium M may be configured as a diffuse and spectrally neutral reflective surface. In this case, the luminance density measurement camera 4 is arranged in the same half space relative to the medium M as the headlight 3 and configured to record the light diffusely reflected by the medium M. The reflective surface may be flat (plane) or likewise curved, e.g. spherical.

The medium M may likewise be configured as a diffusion disk. In this case, the luminance density measurement camera 4 is arranged opposite the headlight 4 relative to the medium M and configured to record the light scattered at the medium M.

The arrangement and orientation of the luminance density measurement camera 4 and the medium M relative to one another and relative to the world coordinate system W are known or are recorded.

In order to assign the photometric characteristic (e.g. the luminance density) recorded by the luminance density measurement camera 4 pixel by pixel in a pixel coordinate system, it is thus required and sufficient to determine the position and orientation of the object coordinate system T relative to the world coordinate system W. The position of the object coordinate system T is determined by the position of the object coordinate system point of origin T.O indicated in coordinate values of the world coordinate system W. The orientation of the object coordinate system T is determined by the position of at least one axis T.x, T.y, T.z, indicated as a directional vector in coordinate values of the world coordinate system W.

In prior art, the position and orientation of the object coordinate system T relative to the world coordinate system W is determined by recording the rotation angles along the hinge axes G of the industrial robot 100 and inserting them into a mechanical movement model of the industrial robot 100 describing the kinematic chain between the base 100.F and the holding device 2. In prior art, the rotation angles are detected by rotation angle sensors, e.g. rotational incremental sensors.

In contrast, the present disclosure proposes to determine the position and orientation of the object coordinate system T relative to the world coordinate system W by direct referencing in the world coordinate system W without referring to the kinematic chain, wherein in a first step, the position of the object coordinate system point of origin T.O is determined as a point in coordinate values of the world coordinate system W by direct referencing, and in a second step the orientation of the object coordinate system T is determined as a directional vector in coordinate values of the world coordinate system W by direct referencing.

The method according to the present disclosure allows that the effort for avoiding or correcting self-deformation of a positioning device 1 can be considerably reduced in contrast to the prior art. In particular, the demands to the mechanical stiffness of elements of the positioning device 1 moved along the kinematic chain relative to one another may be relaxed. This way, costs, space and weight of a positioning device 1 may be saved.

Moreover, position sensors arranged on an output side for a precise determination of the relative position of all elements of a positioning device 1 linked along the kinematic chain and movable relative to each other are no longer required due to the method according to the present disclosure. Therefore, costs and construction effort for such a positioning device 1 are reduced.

Figure 3:
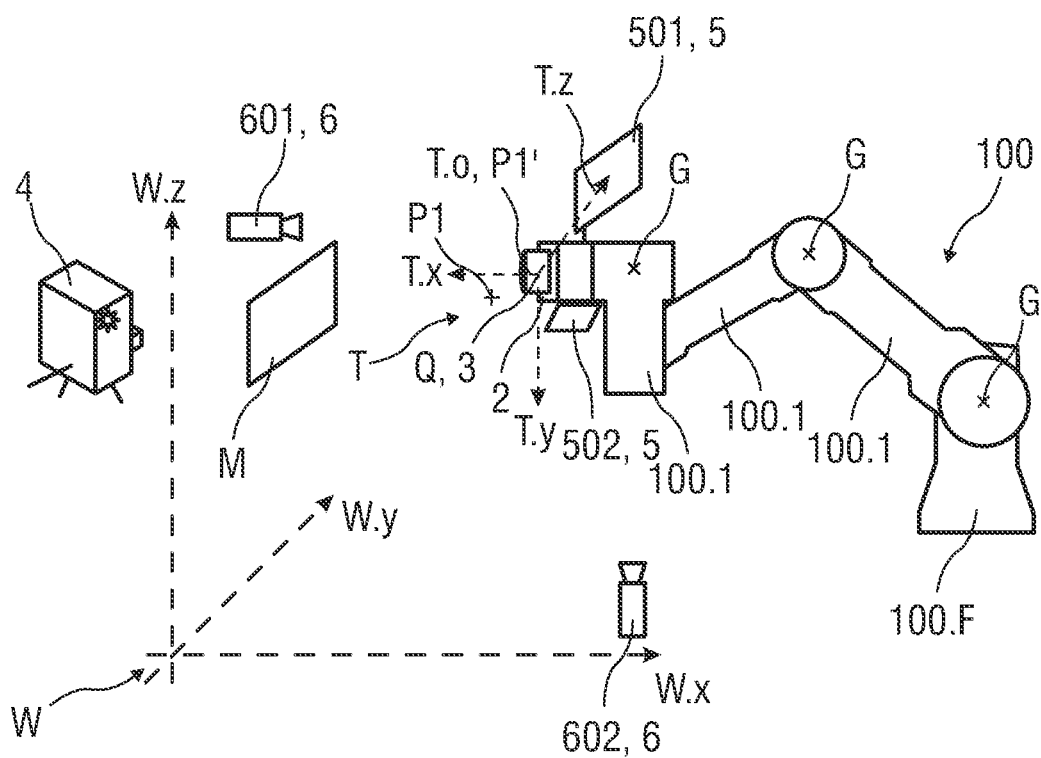
FIG. 3 is a schematic view of a positioning device configured as an industrial robot with measuring disks arranged thereon.

Firstly, embodiments for a determination of the position of the object coordinate system point or origin T.O are explained referring to FIGS. 2 and 3.

Figure 4:
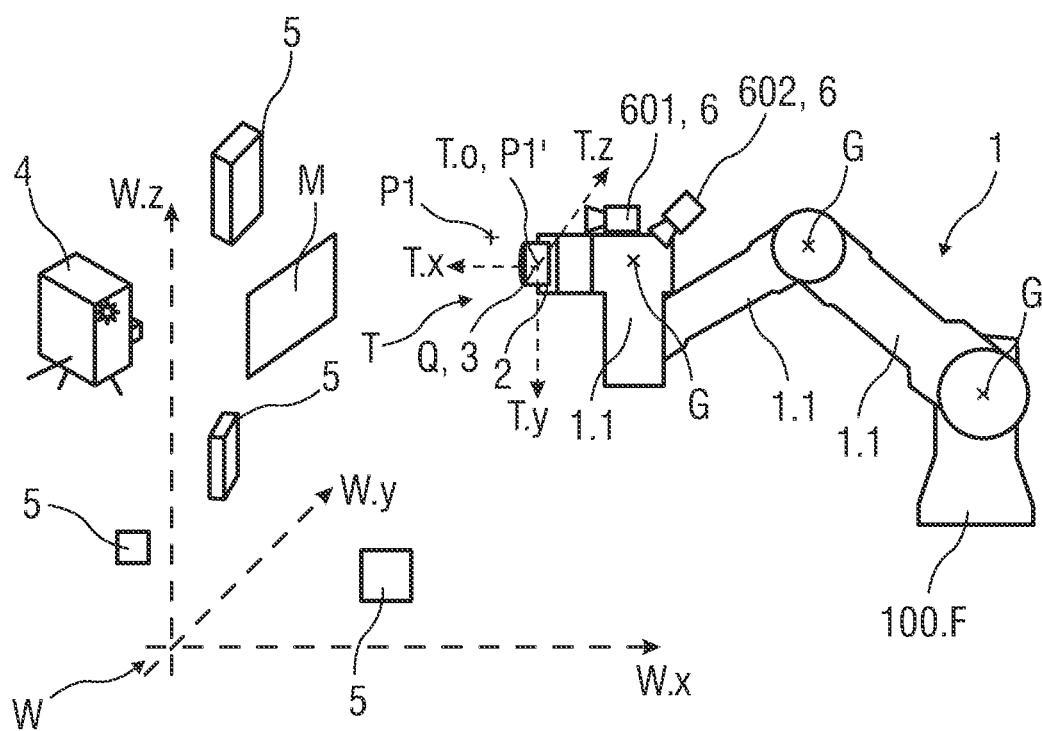
FIG. 4 is a schematic view of a positioning device configured as an industrial robot with referencing cameras arranged thereon.
Figure 5:
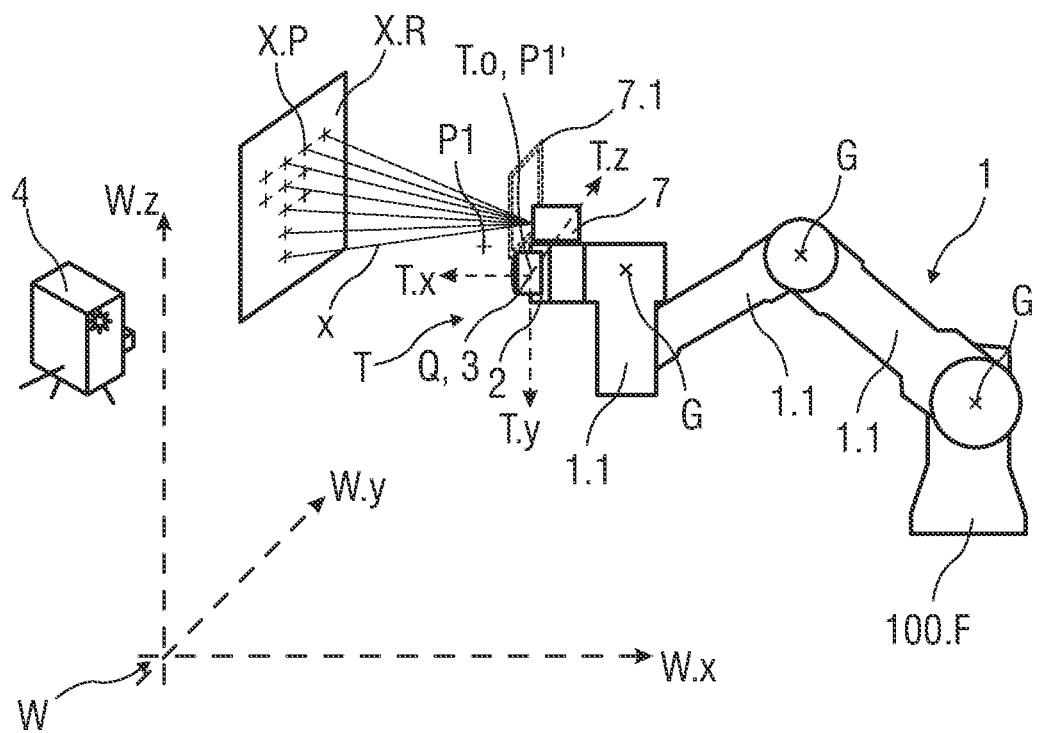
FIG. 5 is a schematic view of a positioning device with a pilot light source for projecting a dot matrix.

Then, embodiments for a determination of the orientation of the object coordinate system T are explained referring to FIGS. 4 and 5.

Only for better intelligibility, the embodiments for a determination of the orientation of the object coordinate system T and for a determination of the position of the object coordinate system point of origin T.O will be explained separately. Preferred embodiments of the present disclosure comprise features of at least one embodiment for a determination of the orientation of the object coordinate system T as well as of at least one embodiment of a determination of the position of the object coordinate system point of origin T.O.

FIG. 2 shows an embodiment, in which a referencing of the object coordinate system T is carried out by the fact that measuring marks 5 are arranged at the headlight 3 held in the holding device 2 and thus stationary to the object coordinate system T.

The measuring marks 5 may be configured as passive measuring marks 5. For example, passive measuring marks 5 may be formed by structures such as edges, corners or printings already present at the headlight 3 (or another light source Q to be charted). Passive measuring marks may also be formed by stickers bonded to the headlight 3, the stickers having visually well perceptible, sharply bounded, high-contrast structures, e.g. QR codes printed in black and white or imprinted black and white contrasting circles or circular rings.

Passive measuring marks 5 may also be configured three-dimensional, e.g. as spheres. Spherical passive measuring marks 5 allow that they are recorded independent of the viewing angle and distortion-free with the contour of a circle. Thus, a particularly high precision and/or accuracy is facilitated when localizing spherical passive measuring marks 5 in a camera image.

In the alternative or additionally, the measuring marks 5 may also be configured as active measuring marks 5 emitting light in the visible or non-visible wavelength range which may be recorded by a referencing camera 601 to 603.

This type of active measuring marks 5 comprise a distinct structure, e.g. a circular light output limited by an aperture, a spherical structure, a punctiform structure having a very narrowly limited light output, or an approximately isotropic radiation characteristic which may for example be achieved by a diffusion disk or a frosted spherical surface.

Preferably, a recognition and assignment of active measuring marks 5 in an image is improved and facilitated by choosing the spectral characteristics of the emitted light such that it is unambiguously and well distinguishable from the light emitted by the light source Q to be charted, e.g. the headlight 3. A spectral separation may for example be achieved by means of a wavelength dependent beam splitter or by means of a spectral filter arranged in front of a referencing camera 601 to 603.

Moreover, a recognition and assignment of active measuring marks 5 may be improved and facilitated by temporally modulating, e.g. keying, the emission of light by the active measuring marks 5.

In the environment of the industrial robot 100, three referencing cameras 601, 602, 603 are arranged stationary relative to the world coordinate system W in such a manner that each measuring mark 5 is captured by a plurality of referencing cameras 601 to 603 in a set measurement position P1 of the object coordinate system point of origin T.O.

The referencing cameras 601 to 603 are known regarding their poses, i.e. regarding the position of their respective capturing plane and regarding the orientation of their respective optical axis, relative to the world coordinate system W and stable during the charting of the headlight 3. Moreover, the referencing cameras 601 to 603 are known regarding their respective imaging properties. In particular, the respective main parameters and distortion parameters of the referencing cameras 601 to 603 are known. Methods for determining the main parameters and distortion parameters of cameras are known in the art.

The active and/or passive measuring marks 5 are configured such that they are unambiguously identifiable in an image recorded by a referencing camera 601 to 603 and have a sharp structure, e.g. a high spatial frequency and/or at least one sharp edge.

Moreover, a calibration gauge not shown in detail whose absolute length (in millimeters) is known along at least one dimension, is arranged visible for the referencing cameras 601 to 603. Such a calibration gauge may for example be formed by a known (charted) distance between two measuring marks 5.

Since the measuring marks 5 are arranged stationary in the object coordinate system T and the referencing cameras 601 to 603 are arranged stationary in the world coordinate system W, the position of a measuring mark 5 relative to the world coordinate system W may be determined by triangulation by comparing the position of the image of this measuring mark 5 in an image of a first referencing camera 601 with the position of the image of the same measuring mark 5 in an image of a further referencing camera 602, 603.

Methods for recognizing the position of an image of a measuring mark 5 in a camera image and for triangulation, i.e. for determining a position of a measuring mark 5 in the world coordinate system W corresponding to the positions of the images of this measuring mark 5 detected in the multiple camera images, are known in the art. In particular, methods of the close-range photogrammetry are known.

When the set measuring position P1 has been approximately reached by means of the rotation angle sensors assigned to the hinge axes G, the measuring marks 5 are recorded by the referencing cameras 601, 602, 603, identified and charted regarding their position in the world coordinate system W using a triangulation method. The position of the object coordinate system point of origin T.O in the world coordinate system W is determined from the known position of the measuring marks 5 relative to the object coordinate system point of origin T.O.

In a beneficial way, lacking stiffness (e.g. sag and/or distortion) of the arm segments 100.1, the imprecision of the determination of the rotation angle along the hinge axes G and an imprecise mechanical movement model of the industrial robot 100 do not affect the precision and/or accuracy of the determination of the position of the object coordinate system point of origin T.O relative to the world coordinate system W.

Thus, it is possible to apply more cost-efficient positioning devices 1 with lower demands to precision and/or accuracy for charting light sources Q, e.g. headlights 3. It is merely required to ensure consistency of the position and/or orientation of the headlight 3 held by the holding device 2 during the recording of a partial segment of an LIDC, respectively. For this purpose, cost-efficient and reliable braking devices for industrial robots 100 are known and available.

In an embodiment of a method for charting a headlight 3, the headlight 3 is initially coarsely pre-positioned by means of the industrial robot 100 at a set measurement position P1. The coarse pre-positioning may occur by analyzing the measurement values of the rotation angle sensors at the hinge axes G.

Subsequently, the industrial robot 100 may be controlled such that the positional displacement of the actual measurement position P1' from the set measurement position P1 is reduced.

This method may be repeated, wherein the positional displacement of the actual measurement position P1' from the set measurement position P1 is iteratively reduced until a desired precision and/or accuracy is reached (i.e. an upper limit for the positional displacement of the actual measurement position P1' from the set measurement position P1 is underrun).

In the alternative, it is also possible to maintain an actual measurement position P1' attained even if it differs from a set measurement position P1 and to take account of the positional displacement of the headlight 3 and thus also of the object coordinate system point of origin T.O, determined by the analysis of the images recorded by the referencing cameras 601, 602, when analyzing the photometric characteristic recorded by the luminance density measurement camera 4 in the pixel coordinate system.

FIG. 3 shows an embodiment, in which the position of the object coordinate system T is determined by the fact that two measuring marks 5 configured as marking disks 501, 502 are arranged at the holding device 2 of the industrial robot 100. As the headlight 3 is fixed in the holding device 2 during the measurement process, the marking disks 501, 502 are arranged stationary to the object coordinate system T.

The marking disks 501, 502 comprise a high.contrast printing pattern, e.g. like a sight disk with concentric, alternating white and black circular rings and/or like cross hairs. The marking disks are not arranged in a coplanar manner Preferably, the marking disks 501, 502 are arranged orthogonal to each other.

In the environment of the industrial robot 100, two referencing cameras 601, 602 are arranged stationary relative to the world coordinate system W in such a manner that, in a set measurement position P1 of the object coordinate system point of origin T.O, each referencing camera 601, 602 captures one respectively assigned marking disk 501, 502. Preferably, the referencing cameras 601, 602 are arranged such that, in and near the set measurement position P1, the respectively assigned marking disk 501, 502 is approximately perpendicular, preferably with an angle between 80° and 100° relative to the optical axis of the referencing camera 601, 602

When the set measuring position P1 has been approximately reached by means of the rotation angle sensors assigned to the hinge axes G, the marking disks 501, 502 are recorded by the respectively assigned referencing camera 601, 602 and charted.

For example, the marking disks 501, 502 and the referencing cameras 601, 602 may be arranged such that a marking disk 501, 502 respectively appears in the center of the pixel coordinate system of the assigned referencing camera 601, 602 when the set measurement position P1 has been ideally reached. Thus, a deviation from the set measurement position P1 of the holding device 2 may be determined regarding all axes W.x, W.y, W.z of the world coordinate system W by determining the deviations from the central position of the marking disk 501, 502 in the pixel coordinate system of the respectively assigned referencing camera 601, 602 and by transferring the deviations into the world coordinate system W according to the reproduction scale.

This embodiment allows that very large deviations from the set measurement position P1 may also be detected by choosing a sufficiently large capturing image angle of the referencing cameras 601, 602. Likewise, it is possible to apply differently formed marking disks 501, 502, e.g. having different printed patterns, in order to avoid confusing coordinates of the identified actual measurement position P1'.

Moreover, it is also possible to apply more than two referencing cameras 601, 602 and/or more than two marking disks 501, 502 to improve precision and/or accuracy and robustness when determining the position.

Multiple marking disks 501, 502, when printed with different patterns, may be recorded jointly by a referencing camera 601, 602. By charting the distance between the centers of the recorded marking disks 501, 502, it is for example possible to determine an inclination angle of a straight line running through the centers of the marking disks 501, 502 relative to the image plane of the referencing camera 601, 602.

In an embodiment not shown in detail, the position and orientation of the holding device 2 (and the object coordinate system T) may be determined relative to the world coordinate system W by three referencing cameras 601, 602 with pairwise perpendicularly oriented image planes and six marking disks 501, 502 in total, of which respectively two are arranged coplanar relative to an image plane of a respectively assigned referencing camera 601, 602.

In a further embodiment not shown in detail, the referencing cameras 601, 602 are replaced by clusters of light barriers formed by respective light sources and photo sensors lying opposite one another and stationary in the world coordinate system W. Marking disks 501, 502 or similarly configured opaque measuring marks 5 rigidly arranged on the holding device 2 interrupt one or more of these light barriers depending on the position and thus allow for determining the position of the holding device 2 along a measuring direction which is respectively perpendicular to a light barrier or perpendicular to multiple light barriers.

FIG. 4 schematically shows an embodiment for determining the orientation of the object coordinate system T.

Referencing cameras 601, 602 are arranged stationary relative to the object coordinate system T at the holding device 2 of the industrial robot 100. The referencing cameras 601, 602 are configured for recording measuring marks 5 arranged stationary relative to the world coordinate system W in the environment of the industrial robot 100.

The measuring marks 5 may be formed by existing, stationary, structured equipment elements of a measuring laboratory, e.g. edges or corners of cabinets, measuring tables, ceiling lights or installations. The measuring marks 5 may likewise be formed as in the embodiment shown in FIG. 3 by especially arranged marking disks 501, 502 or similar high-contrast and structured markings.

The aperture angles of the referencing cameras 601, 602 are chosen such that they capture at least one of the measuring marks 5 in each position and orientation of the holding device 2. Moreover, the referencing cameras 601, 602 are arranged on the positioning device such that their respective optical axis may be changed by a movement of the industrial robot 100 relative to the world coordinate system W.

Preferably, the referencing cameras 601, 602 are arranged after the last movable member of the kinematic chain, e.g. in fixed position and orientation relative to the holding device 2.

In a calibrating phase, the surrounding space is scanned completely by the referencing cameras 601, 602. For each referencing camera 601, 602, a correlation data set is generated which relates a respectively recorded image to a pose, i.e. to a position and an orientation, of the holding device 2 and thus also of the referencing camera 601, 602.

In a manner analogue to the embodiment delineated with reference to FIG. 2, the orientation of the object coordinate system T may be determined by charting the pixel coordinates of the images of the measuring marks 5 in the images recorded by the referencing cameras 601, 602.

In a subsequent working phase, an image recorded by a referencing camera 601, 602 is overlapped with at least one image of the stored correlation data set, and based on this, the orientation of the optical axis of the respective referencing camera 601, 602 is determined.

Even with a single referencing camera 601, 602, the orientation of the object coordinate system T may thus be determined, if the position thereof, i.e. the position of the object coordinate system point of origin T.O, has been determined previously, for example as delineated with reference to FIG. 3.

Using a plurality of referencing cameras 601, 602, the position of the object coordinate system T may be determined or verified from the determined optical axes of the referencing cameras 601, 602 by intersecting.

FIG. 5 shows an embodiment of the industrial robot 100, in which a pilot light source 7 having an optical principal plane 7.1 is arranged stationary relative to the holding device 2, the pilot light source 7 projecting a pattern along pilot rays X into the space. The pose (position and orientation) of the pilot light source 7 relative to the local coordinate system T is known from mounting the pilot light source 7 to the holding device 2.

The pilot light source 7 may for example be configured as a diffractive optical element (DOE) and be configured such that a dot matrix X.R having dots X.P is radiated approximately with a 1-degree-grid into a partial space, e.g. into a half space, wherein each pilot beam X corresponds to a projection dot X.P of the dot matrix X.R. Preferably, the pilot light source 7 radiates in the non-visible and low-energy range.

Figure 6:
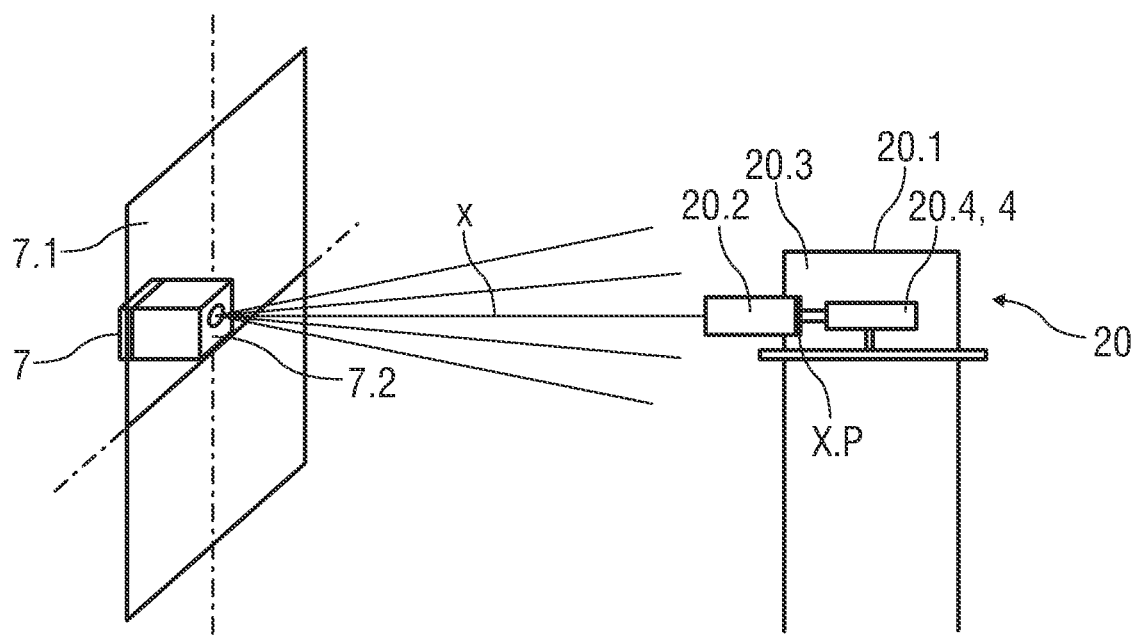
FIG. 6 is a schematic view of an optical capturing device for partially capturing a projected dot matrix.

A section of the dot matrix X.R is captured by an optical capturing device 20 shown in FIG. 6 and arranged stationary in a known position and orientation in the world coordinate system W. The capturing device 20 is arranged such that it captures at least one pilot beam X.

The capturing device 20 comprises an opaque housing 20.1 which has an aperture tube 20.2 at an entrance side. The aperture tube 20.2 protrudes into the opaque housing 20.1 and is terminated at the end protruding into the housing 20.1 by a diffuse screen 20.3, onto which the at least one captured pilot beam X is reproduced as a projection dot X.P. The aperture tube 20.2 may be configured such that only a single pilot beam X is guided onto the screen 20.3, and thus, only a single projection dot X.P is reproduced on the screen.

In the direction of the pilot beam X behind the screen 20.3, a capturing camera 20.4 is arranged which records an image of the screen 20.3 with the at least one projection dot X.P projected thereon. The capturing camera 20.4 may be configured as a luminance density measurement camera.

A change of the orientation of the holding device 2 corresponds to a rotation of the principal plane 7.1 about a rotation center 7.2 in a horizontal angle φ and/or in a vertical angle θ. Thus, the pilot beam X is also rotated by the horizontal angle φ and/or by the vertical angle θ and the corresponding projection dot X.P is moved correspondingly in the horizontal and/or vertical direction on the screen 20.3.

The position of a dot X.P on the screen 20.3 is determined using the capturing camera 20.4. The position of the rotation center 7.2 of the principal plane 7.1 is known from the determination of the position of the object coordinate system T and from the known pose of the pilot light source 7 in this object coordinate system T. The horizontal angle φ can thus be determined from the horizontal position of a dot X.P and the vertical angle θ may be determined from the vertical position of a point X.P.

In order to avoid ambiguity when determining the angles φ and θ, the at least one pilot beam X falling on the screen 20.3 through the aperture tube 20.2 has to be identified. For this purpose, the beam profiles of different pilot beams X, in particular neighboring pilot beams X, may be designed differently by means of a DOE. For example, different beam profiles may be designed such that neighboring dots X.P in the dot matrix X.R have different dimensions and/or different intensities and/or different structures when being projected onto the screen 20.3 and are thus distinguishable by means of the capturing camera 20.4.

In the alternative or in addition, the at least one pilot beam X falling on the screen 20.3 through the aperture tube 20.2 may be identified by determining the orientation of the object coordinate system T coarsely, i.e. with the resolution of the solid angle grid in which the pilot beams X diverge.

Such a coarse determination of the orientation of the object coordinate system T, for example with a resolution of one degree, is possible by simple sensorics at the hinge axes G of the industrial robot 100. In the alternative or in addition, a coarse determination may be carried out by determining the position of a plurality of measuring marks 5 according to a method delineated with reference to FIGS. 2 and 3.

Based on such a coarse determination of the orientation which only needs to be sufficient for identifying the at least one dot X.P from the dot matrix X.R captured on the screen 20.3, a determination of the angle φ and θ improved by magnitudes, e.g. with a resolution of 1/100 degree to 1/1000 degree, is possible by the determination of the position of this at least one dot X.P by means of the capturing camera 20.4

Figure 7:
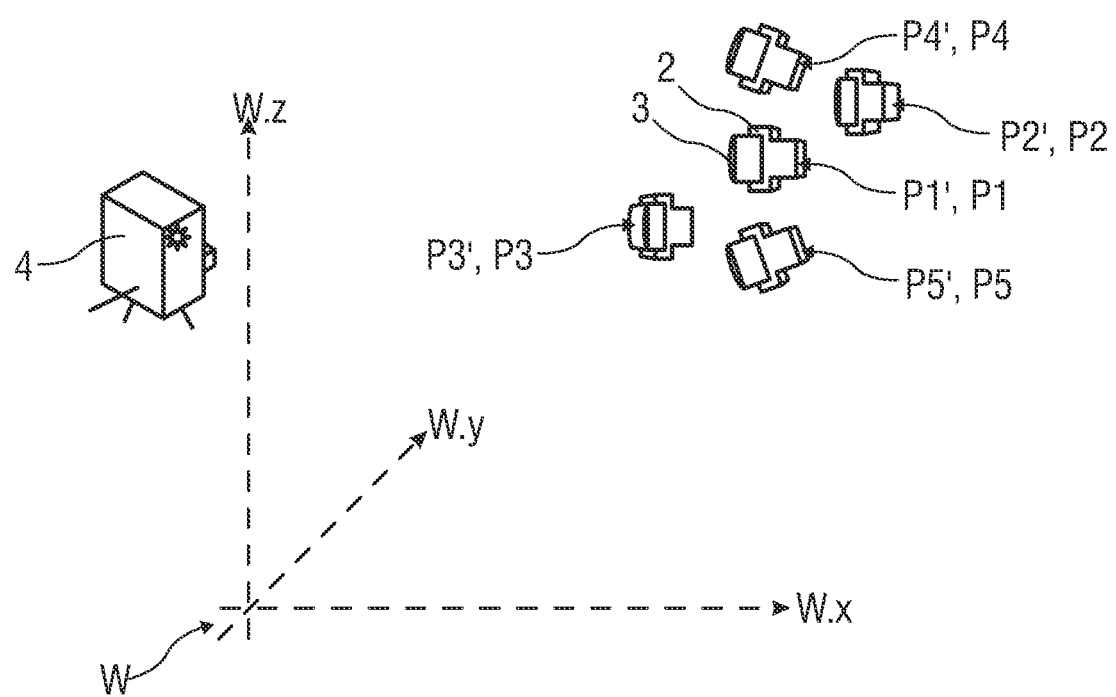
FIG. 7 is a schematic view of a holding device with a vehicle headlight in different actual measurement positions.

In a further embodiment schematically shown in FIG. 7, an incremental change of the orientation and/or position of the headlight 3 held by the industrial robot 100 is determined by registering luminance density measurement images 81 to 85. Presently, the headlight 3 is configured as a vehicle headlight 3.

For this purpose, a first to fifth set measurement position P1 to P5 is subsequently approached by rotation about at least one hinge axis G of the industrial robot 100. Thereby, the first to fifth actual measurement position P1' to P5' actually reached is approximately determined by means of the rotation angle sensors not shown in detail which are assigned to the hinge axes of the industrial robot 100. In the alternative or in addition, the first to fifth actual measurement position P1' to P5' may also be determined by an embodiment of the method delineated with reference to FIG. 1 to FIG. 4.

Figure 8:
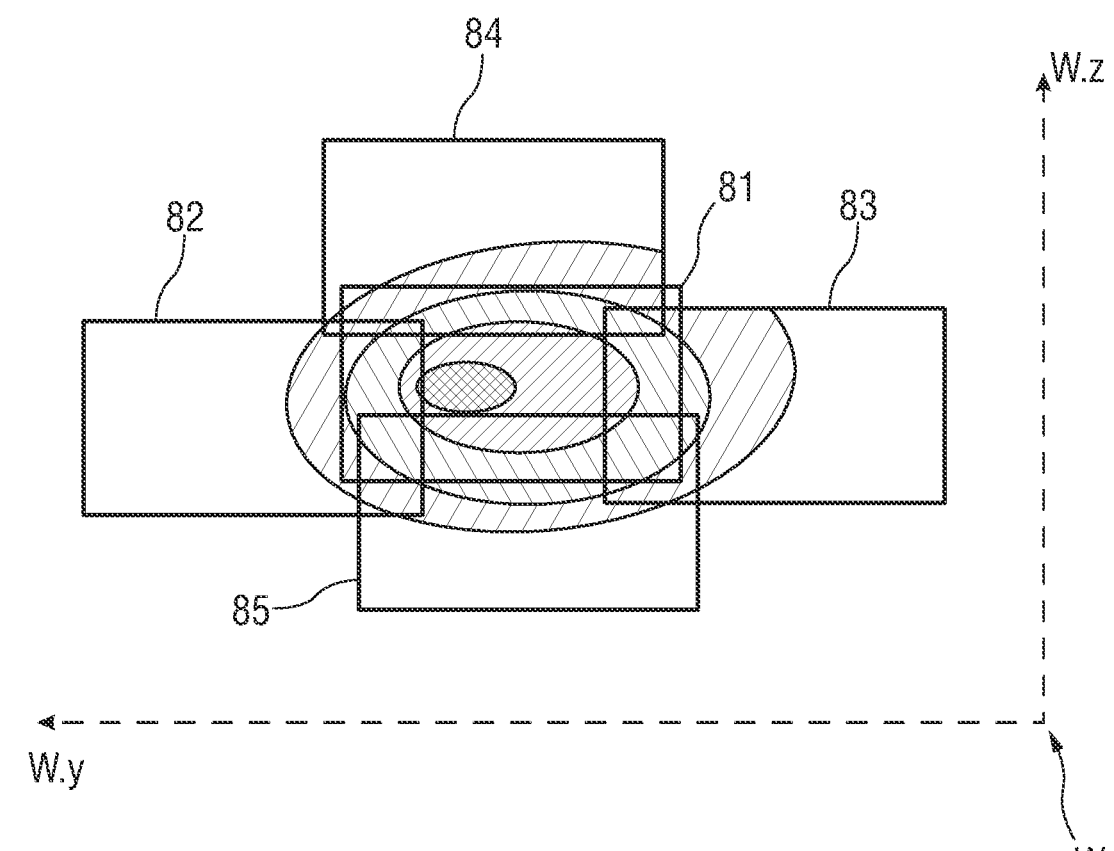
FIG. 8 is a schematic view of luminance density measurement images of a vehicle headlight recorded from different actual measurement positions.

In the first to fifth actual measurement position P1' to P5', a respective first to fifth luminance density measurement image 81 to 85 schematically shown in FIG. 8 of the turned on vehicle headlight 3 is recorded by the luminance density measurement camera 4.

The first to fifth set measurement position P1 to P5 are configured and arranged such that the corresponding luminance density measurement images 81 to 85 have an overlap which is at least pairwise sufficient for an image registration, even when taking account of the maximum possible deviations of the actual measurement positions P1' to P5' when approaching the set measurement positions P1 to P5.

In other words: even with the most adverse arrangement of the actual measurement positions P1' to P5' within the positioning tolerance possible e.g. by the imprecision of the rotation angle sensors at the hinge axes G and/or the self-deformation of the arm segments 100.1 of the industrial robot 100, the luminance density measurement images 81 to 85 have an overlap sufficient for image registration.

Methods for image registration, wherein intensity images (e.g. greyscale or color images), which are staggered to one another and/or distorted, are overlapped, are known in the art, e.g. from the publication B. Zitova, J. Flusser: *Image registration methods: a survey, Elsevier. Image and Vision Computing*, vol. 21, 2003, S. 977-1000. The extent of the overlap sufficient for image registration, e.g. depending on the structure, the contrast or the distortion of the intensity images, is also known.

For example, the first to fifth set measurement position P1 to P5 are arranged and configured such that the first luminance density measurement image 81 as an anchor image assigned to the first set measurement position P1 has an overlap with each further luminance density measurement image 82 to 85 sufficient for image registration.

Likewise it is possible that a plurality of set measurement positions P1 to P5 are configured such that the assigned luminance density measurement images 81 to 85 are arranged in a strip pattern.

Likewise, any other planarly extending arrangement of the luminance density measurement images 81 to 85 may be achieved by arranging and configuring the corresponding set measurement positions P1 to P5, provided that each luminance density measurement image 81 to 85 is linked in an overlapping manner with each other luminance density measurement image 81 to 85 through at least one overlap path, wherein in each case two neighboring luminance density measurement images 81 to 85 (i.e. predecessor and successor in the overlap path) have an overlap sufficient for image registration along an overlap path of luminance density measurement images 81 to 85, wherein the overlap has to be sufficient for image registration even if the actually reached actual measurement position P1' bis P5' deviates to a maximum adverse extent from the assigned set measurement position P1 bis P5 within the positioning precision and/or accuracy of the industrial robot 100.

This embodiment allows that the luminance density distribution generated by a vehicle headlight 3 can be recorded on a large-scale, in principle across any extension, in particular extends beyond the recording area of a single luminance density measurement image 81 to 85, wherein merely low demands are made to the positioning precision and/or accuracy of the industrial robot 100, in particular to its mechanical stiffness and to the precision and/or accuracy of its position or angle sensors.

LIST OF REFERENCES 1 positioning device
100 industrial robot, positioning device
100.1 arm segment
2 holding device
3 headlight, vehicle headlight
4 luminance density measurement camera
5 measuring mark
501, 502 marking disk, measuring mark
6 referencing instrument
601, 602, 603 referencing instrument, referencing camera
7 pilot light source
7.1 principal plane
7.2 rotation center
81 to 85 first to fifth luminance density measurement image
10 Goniometer, positioning device
10.1 stand arm
10.2 holding plate, holding device
10.D rotation center
10.F base
10.S stand
10.X, 10.Y, 10.Z first, second, third translation axis
10.H, 10.V horizontal, vertical rotation axis
20 capturing device
20.1 housing
20.2 aperture tube
20.3 screen
20.4 capturing camera
φφ horizontal angle
θθ vertical angle
M medium, capturing plane, measurement surface
G hinge axis
P1 (first) set measurement position
P1' (first) actual measurement position
P2 to P5 second to fifth set measurement position
P2' to P5' second to fifth actual measurement position
Q light source
T object coordinate system
T.O object coordinate system point of origin
T.x object x-axis
T.y object y-axis
T.z object z-axis
W world coordinate system
W.x world x-axis
W.y world y-axis
W.z world z-axis
X pilot beam
X.R projection matrix, dot matrix
X.P projection structure, projection dot

What is claimed is:

1. A method for photometrical charting of a light source clamped within a positioning device, the positioning device comprising a plurality of machine coordinate systems which move against each other according to a kinematic chain, and the light source having an object coordinate system by means of a luminance density measurement camera arranged stationary relative to a world coordinate system, the method comprising:
   moving a light source between a first actual measurement position and at least one further actual measurement position along the kinematic chain of the positioning device within the world coordinate system,
   recording a luminance density measurement image describing the spatial distribution of a photometric characteristic within a measurement surface by means of the luminance density measurement camera in each actual measurement position with the light source turned on,
   recording the position and/or orientation of the object coordinate system relative to the world coordinate system in each actual measurement position in direct reference to the world coordinate system without reference to the kinematic chain of the positioning device, and
   recording the position and/or orientation relative to the world coordinate system in an actual measurement position by direct reference to the world coordinate system without reference to the kinematic chain of the positioning device with a guaranteed recording tolerance that is, with respect to at least one parameter, smaller than a guaranteed positioning tolerance of the positioning device,
   wherein the guaranteed recording tolerance is defined as a maximum deviation of the actual measurement position and/or orientation from the recorded position and/or orientation relative to the world coordinate system, and the guaranteed positioning tolerance is defined as a maximum deviation of the actual measurement position from a predetermined set measurement position, and
   wherein the positioning device is selected with a positioning tolerance less or equal to a required positioning tolerance, which required positioning tolerance is determined to be sufficient such that a sequence of predetermined set measurement positions are arranged and approached such that the photometric characteristic of the light source is completely recorded when the light source reaches actual measurement positions corresponding to the predetermined set measurement positions, wherein each actual measurement position is within the required positioning tolerance from the corresponding predetermined set measurement position.

2. The method according to claim 1, characterized in that the measurement surface is formed by a medium configured for diffuse reflection and/or scattering of the light emitted by the light source, and arranged in fixed position and orientation relative to the world coordinate system, illuminated by the light source and recorded by the luminance density measurement camera.

3. The method according to claim 1, characterized in that the luminance density measurement camera records the light source in a direct optical path, wherein the measurement surface is arranged on a surface of the light source facing the luminance density measurement camera.

4. The method according to claim 1, characterized in that the light source is rotated around at least one axis running through a rotation center.

5. The method according to claim 1, characterized in that in a first step, the position of the object coordinate system relative to the world coordinate system is determined by direct probing of at least one measuring mark, and in a second step, the orientation of the object coordinate system relative to the world coordinate system is determined.

6. The method according to claim 1, characterized in that the position and/or orientation of the object coordinate system is determined by recording at least one measuring mark by means of at least one referencing camera in each case.

7. The method according to claim 6, characterized in that at least one referencing camera is arranged stationary relative to the world coordinate system and at least one measuring mark is arranged stationary relative to the object coordinate system.

8. The method according to claim 6, characterized in that at least one referencing camera is arranged stationary relative to the object coordinate system and at least one measuring mark is arranged stationary relative to the world coordinate system.

9. The method according to claim 6, characterized in that at least one measuring mark is configured as an active measuring mark for emitting a radiation recordable by at least one assigned referencing camera.

10. The method according to claim 1, characterized in that at least one capturing plane is arranged stationary in the world coordinate system, that the position of the object coordinate system in the world coordinate system is determined, and the respective orientation of the object coordinate system is determined for each position from a charting of a modulated illumination emitted with a known direction relative to the object coordinate system and captured on the at least one capturing plane.

11. The method according to claim 1, characterized in that for each actual measurement position a respective set measurement position is determined by analyzing parameters of the positioning device, and the position and orientation of the object coordinate system is recorded based on the set measurement position.

12. The method according to claim 11, characterized in that for approaching a set measurement position, the positioning device is respectively controlled such that an actual measurement position is reached within a predetermined distance from the respectively assigned set measurement position.

13. The method according to claim 1, wherein the light source is a headlight.

14. The method according to claim 13, wherein the headlight is a vehicle headlight.

15. A method for photometrical charting of a light source clamped within a positioning device, the positioning device comprising a plurality of machine coordinate systems which move against each other according to a kinematic chain, and the light source having an object coordinate system by means of a luminance density measurement camera arranged stationary relative to a world coordinate system, the method comprising:
  moving a light source between a first actual measurement position and at least one further actual measurement position along the kinematic chain of the positioning device within the world coordinate system,
  recording a luminance density measurement image describing the spatial distribution of a photometric characteristic within a measurement surface by means of the luminance density measurement camera in each actual measurement position with the light source turned on,
  recording the position and/or orientation of the object coordinate system relative to the world coordinate system in each actual measurement position in direct reference to the world coordinate system without reference to the kinematic chain of the positioning device,
  wherein at least one capturing plane is arranged stationary in the world coordinate system, that the position of the object coordinate system in the world coordinate system is determined, and the respective orientation of the object coordinate system is determined for each position from a charting of a modulated illumination emitted with a known direction relative to the object coordinate system and captured on the at least one capturing plane, and
  generating the modulated illumination by means of a diffractive-optical element as a projection matrix comprising at least one projection structure projected along a pilot beam onto a capturing plane in each position from the charting of a modulated illumination.

16. The method according to claim 15, wherein the positioning device is selected with a positioning tolerance less or equal to a required positioning tolerance, which required positioning tolerance is determined to be sufficient such that a sequence of predetermined set measurement positions are arranged and approached such that the photometric characteristic of the light source is completely recorded when the light source reaches actual measurement positions corresponding to the predetermined set measurement positions, wherein each actual measurement position is within the required positioning tolerance from the corresponding predetermined set measurement position.

17. A method for photometrical charting of a light source clamped within a positioning device, the positioning device comprising a plurality of machine coordinate systems which move against each other according to a kinematic chain, and the light source and having an object coordinate system by means of a luminance density measurement camera arranged stationary relative to a world coordinate system, the method comprising:
  moving a light source between a first actual measurement position and at least one further actual measurement position along the kinematic chain of the positioning device within the world coordinate system,
  recording a luminance density measurement image describing the spatial distribution of a photometric characteristic within a measurement surface by means of the luminance density measurement camera in each actual measurement position with the light source turned on,
  recording the position and/or orientation of the object coordinate system relative to the world coordinate system in each actual measurement position in direct reference to the world coordinate system without reference to the kinematic chain of the positioning device,
  wherein at least one capturing plane is arranged stationary in the world coordinate system, that the position of the object coordinate system in the world coordinate system is determined, and the respective orientation of the object coordinate system is determined for each position from a charting of a modulated illumination emitted with a known direction relative to the object coordinate system and captured on the at least one capturing plane,
  the modulated illumination is emitted by the light source,
  controlling the positioning device such that when the light source is moved towards a set measurement position, an actual measurement position is reached, wherein the actual measurement position is respectively lying within a predetermined distance around the corresponding set measurement position,
  recording in each actual measurement position at least one luminance density measurement image,
  choosing the set measurement positions such that at least two luminance density measurement images overlap, and
  determining an offset between luminance density measurement images overlapping each other by means of an image registering method, and determining the respective orientation of the object coordinate system from the offset and from the actual measurement positions respectively assigned to the luminance density measurement images.

18. The method according to claim 17, wherein the positioning device is selected with a positioning tolerance less or equal to a required positioning tolerance, which required positioning tolerance is determined to be sufficient such that a sequence of predetermined set measurement position are arranged and approached such that the photometric characteristic of the light source is completely recorded when the light source reaches actual measurement positions corresponding to the predetermined set measurement positions, wherein each actual measurement position is within the required positioning tolerance from the corresponding predetermined set measurement position.

* * * * *